(12) United States Patent
Rai

(10) Patent No.: US 6,806,881 B2
(45) Date of Patent: Oct. 19, 2004

(54) GRAPHICS CONTROLLER FOR HIGH SPEED TRANSMISSION OF MEMORY READ COMMANDS

(75) Inventor: Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 262 days.

(21) Appl. No.: 10/128,829

(22) Filed: Apr. 24, 2002

(65) Prior Publication Data

US 2003/0052888 A1 Mar. 20, 2003

Related U.S. Application Data

(60) Provisional application No. 60/323,533, filed on Sep. 18, 2001.

(51) Int. Cl.[7] .............................................. G06F 15/76
(52) U.S. Cl. ..................................... 345/519; 345/531
(58) Field of Search ................................ 345/531, 522, 345/501, 519, 536, 530

(56) References Cited

U.S. PATENT DOCUMENTS

| | | | |
|---|---|---|---|
| 5,003,465 A | | 3/1991 | Chisholm et al. |
| 5,129,065 A | * | 7/1992 | Priem et al. ................. 710/311 |
| 5,299,309 A | * | 3/1994 | Kuo et al. ................... 345/522 |
| 5,442,775 A | | 8/1995 | Whitted, III et al. |
| 6,025,855 A | * | 2/2000 | Meinerth et al. ............ 345/522 |
| 6,029,250 A | | 2/2000 | Keeth |
| 6,032,238 A | | 2/2000 | Green, III et al. |
| 6,075,546 A | * | 6/2000 | Hussain et al. .............. 345/522 |
| 6,141,023 A | * | 10/2000 | Meinerth et al. ............ 345/522 |
| 6,175,905 B1 | | 1/2001 | Manning |
| 6,202,119 B1 | | 3/2001 | Manning |
| 6,253,297 B1 | | 6/2001 | Chauvel et al. |

* cited by examiner

*Primary Examiner*—Kee M. Tung
(74) *Attorney, Agent, or Firm*—Mark P. Watson

(57) ABSTRACT

A graphics controller for high speed transmission for memory read commands. The graphics controller chip includes a logic circuit coupled to a first memory. The logic circuit is adapted to respond to a first issued command from a CPU by determining whether the condition that a first command is a memory read command is true. If the condition is true, the logic circuit causes the graphics controller chip to store the first command in the first memory and to begin carrying out the first command. If the condition is false, the logic circuit causes the graphics controller chip to check whether the graphics controller chip is ready to carry out the first command. If the graphics controller chip is not ready to carry out the first command, the logic circuit causes the graphics controller chip to continue checking and to send a signal to the CPU indicating that the graphics controller chip is ready to receive a second command from the CPU.

30 Claims, 10 Drawing Sheets

PRIOR ART Fig. 5

GRAPHICS CONTROLLER FOR HIGH SPEED TRANSMISSION OF MEMORY READ COMMANDS

CONTINUING APPLICATION DATA

This application claims the benefit of U.S. Provisional Application No. 60/323,533 filed Sep. 18, 2001 under 35 U.S.C. §119(e).

FIELD OF THE INVENTION

The present invention relates to a graphics controller for high speed transmission of memory read commands. More particularly, the present invention is directed to a graphics controller with a read/write state machine for accepting high speed transmission of memory read commands initiated by the CPU.

BACKGROUND OF THE INVENTION

A common practice in the art of computer architecture is to move frequently performed, computationally intensive operations from the CPU to a special purpose functional unit, such as a graphics controller. The graphics controller is typically a separate integrated circuit ("chip"). In a computer system with a graphics controller chip, the graphics controller handles various tasks associated with displaying images on a display (such as converting primitive data to pixels), freeing the CPU to perform other tasks. Moving graphics operations from the CPU to the graphics controller improves the performance of the computer system. In practice, however, the amount of improvement is generally not as great as expected. The reason is that the transfer of data between the CPU and the graphics controller becomes a bottleneck that places a limit on the amount of improvement that can be realized. To illustrate the effect of the data transfer bottleneck, consider that in a typical computer system the CPU theoretically requires only 2 bus clock cycles ("BCLKs") to perform a memory write command and 4 BCLKs to perform a memory read command. In practice, however, writing to a prior art graphics controller requires 5 BCLKs and reading requires up to 8 BCLKs. During the 3–4 additional BCLKs that are required with a prior art graphics controller, the CPU does not perform any useful work.

The transfer of data between a CPU and a graphics controller involves a number of steps. These steps must be coordinated so that data is not transferred to the graphics controller faster than it can accept it and so that the CPU knows when the data it has requested is available. To regulate the flow of data from the CPU to the graphics controller, the graphics controller includes a read/write control circuit that can be defined as a read/write state machine.

The read/write state machine typically has four states: An "idle" state in which the graphics controller waits for a command from the CPU; a "pause" state in which the read/write state machine checks whether the graphics controller is ready to process the command; a "request" state in which the graphics controller begins processing the command; and, an "end" state in which the graphics controller finishes processing the command. The read/write state machine transitions from state to state in a fixed sequence for each memory cycle. When the read/write state machine receives a command, it transitions sequentially from the idle state to the pause state to the request state to the end state. From the end state, the read/write state machine returns to the idle state where it waits for the next command. While the read/write state machine may remain in a state for one clock period or longer, depending on the type and sequence of commands, the state transition sequence does not change.

A bottleneck occurs, for example, when the CPU issues a memory read command. The graphics controller requires more time to process the memory read command than the CPU requires to send a subsequent command. Because the CPU does not perform any useful work while it is waiting for the graphics controller to accept another command, the prior art read/write state machine degrades the overall performance of the computer system.

Accordingly, there is a need for a graphics controller that is capable of accepting high speed transmission of memory read commands initiated by a CPU.

BRIEF SUMMARY OF THE INVENTION

The invention disclosed herein is a graphics controller for high speed transmission for memory read commands. Within the scope of the invention, there is a graphics controller chip for use with an off-chip CPU issuing a plurality of commands. The graphics controller chip preferably comprises a logic circuit coupled to a first memory. The logic circuit is adapted to respond to a first issued command from a CPU by determining whether the condition that a first command is a memory read command is true. If the condition is true, the logic circuit causes the graphics controller chip to store the first command in the first memory and to begin carrying out the first command. If the condition is false, the logic circuit causes the graphics controller chip to check whether the graphics controller chip is ready to carry out the first command. If the graphics controller chip is not ready to carry out the first command, the logic circuit causes the graphics controller chip to continue checking and to send a signal to the CPU indicating that the graphics controller chip is ready to receive a second command from the CPU.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
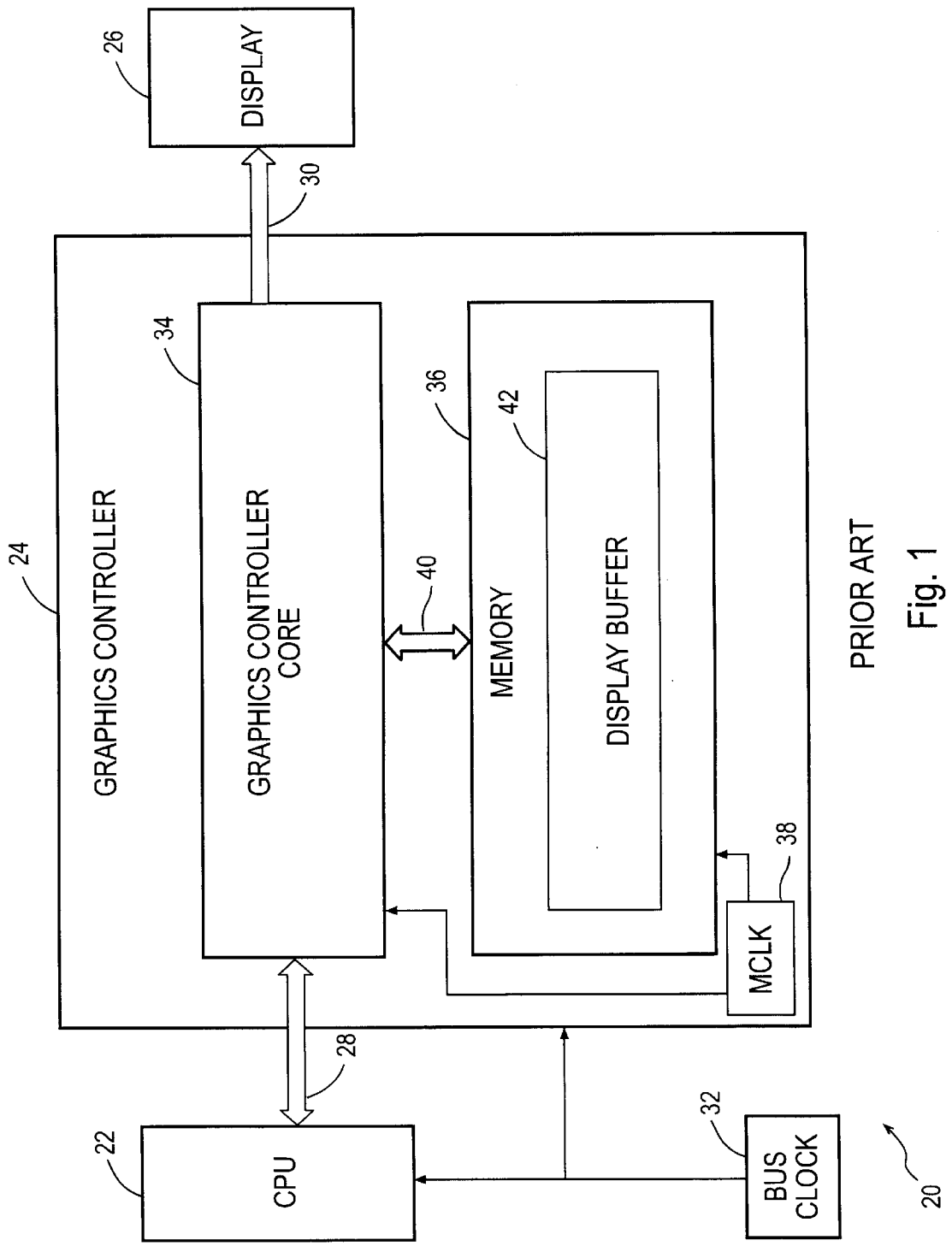
FIG. 1 is a block diagram illustrating an exemplary prior art computer system including a CPU, a display, and a graphics controller.

FIG. 1 illustrates a prior art computer system 20 including a graphics controller 24, a CPU 22, and a display 26. The computer system 20 illustrates a preferred context for the present invention; however, other contexts for the invention are contemplated, but this is not-essential. As mentioned, the CPU 22 and the graphics controller 24 are typically separate chips. In addition, memory controllers of types other than the graphics controller 24 are contemplated.

The graphics controller 24 is coupled to the CPU 22 by a system bus 28. The graphics controller 24 is coupled to the display 26 by a display bus 30. To synchronize memory cycles between the CPU 22 and the graphics controller 24, a bus clock 32 is coupled to the CPU 22 and to the graphics controller 24. A graphics controller core 34, a memory 36, and memory clock ("MCLK") 38 are included within the graphics controller 24. The graphics controller core 34 is coupled to the memory 36 by a memory bus 40. The memory clock 38 is coupled to the memory 36 and to the graphics controller core 34. The memory 36 includes the shown display buffer 42, but may also contain other types of data, such as audio data or video data.

Figure 2:
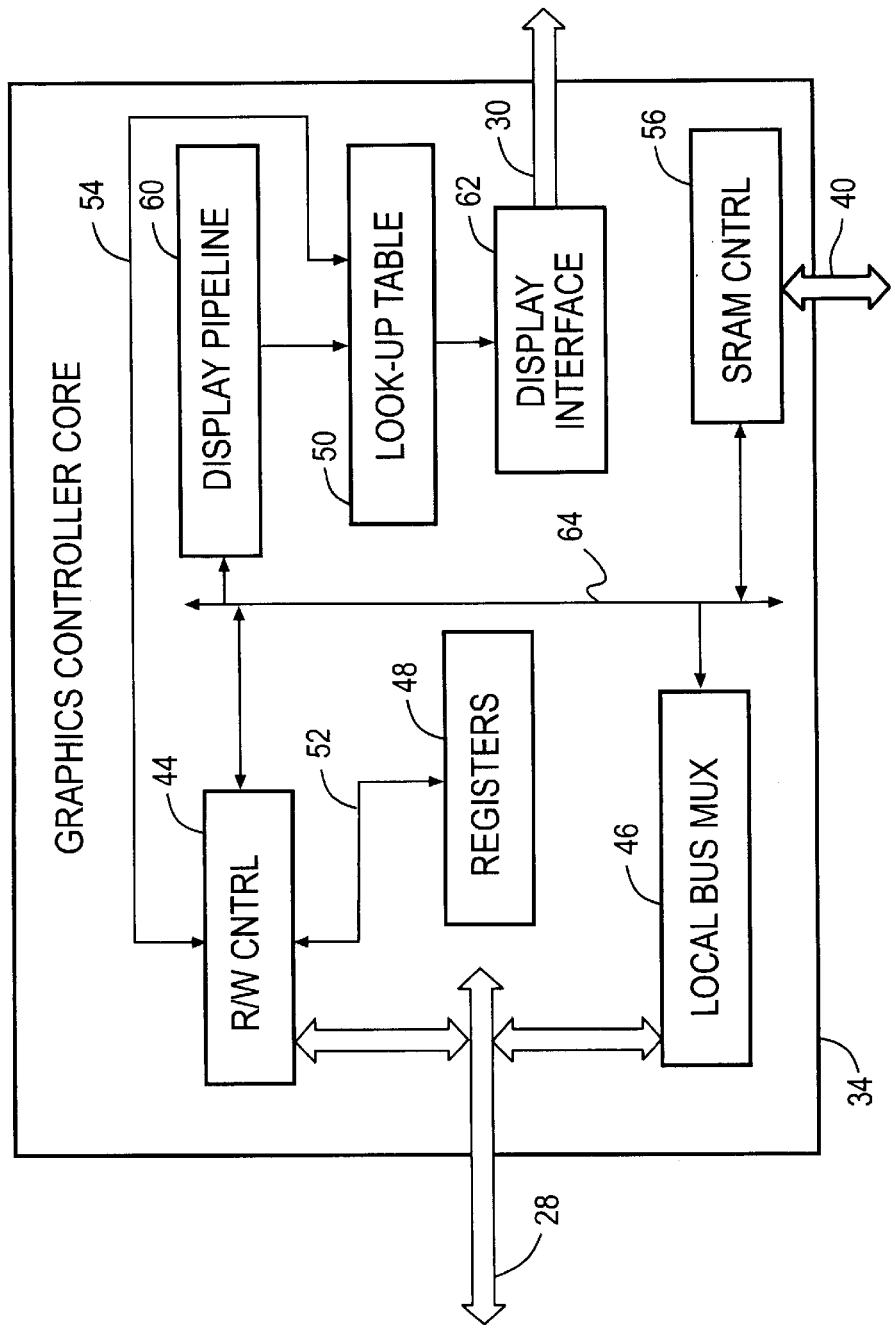
FIG. 2 is a block diagram illustrating functional blocks, including a read/write controller and a local bus multiplexer, within the graphics controller of FIG. 1.

FIG. 2 illustrates some of the functional blocks included within the graphics controller core 34: a read/write controller ("R/W CNTRL") 44, a local bus multiplexer ("local bus mux") 46, a set of registers 48, a look-up table ("LUT") 50, an SRAM controller ("SRAM CNTRL") 56, a display pipeline 60, and a display interface 62. The read/write controller 44 is coupled to the registers 48 via a register bus 52 and to the look-up table 50 via a look-up table bus 54. The read/write controller 44, the SRAM controller 56, the local bus mux 46, and the display pipeline 60 are coupled to each other via a graphics controller core bus 64. Both the read/write controller 44 and the local bus mux 46 are coupled to the system bus 28. The SRAM controller 56 is coupled to the memory 36 via the memory bus 40. The display interface 62 is coupled to the display 28 via the display bus 30. The registers 48 store configuration and other information. The look-up table 50 stores information needed for pixel processing. The SRAM controller 56 provides access and management functions for the memory 36.

Figure 3:
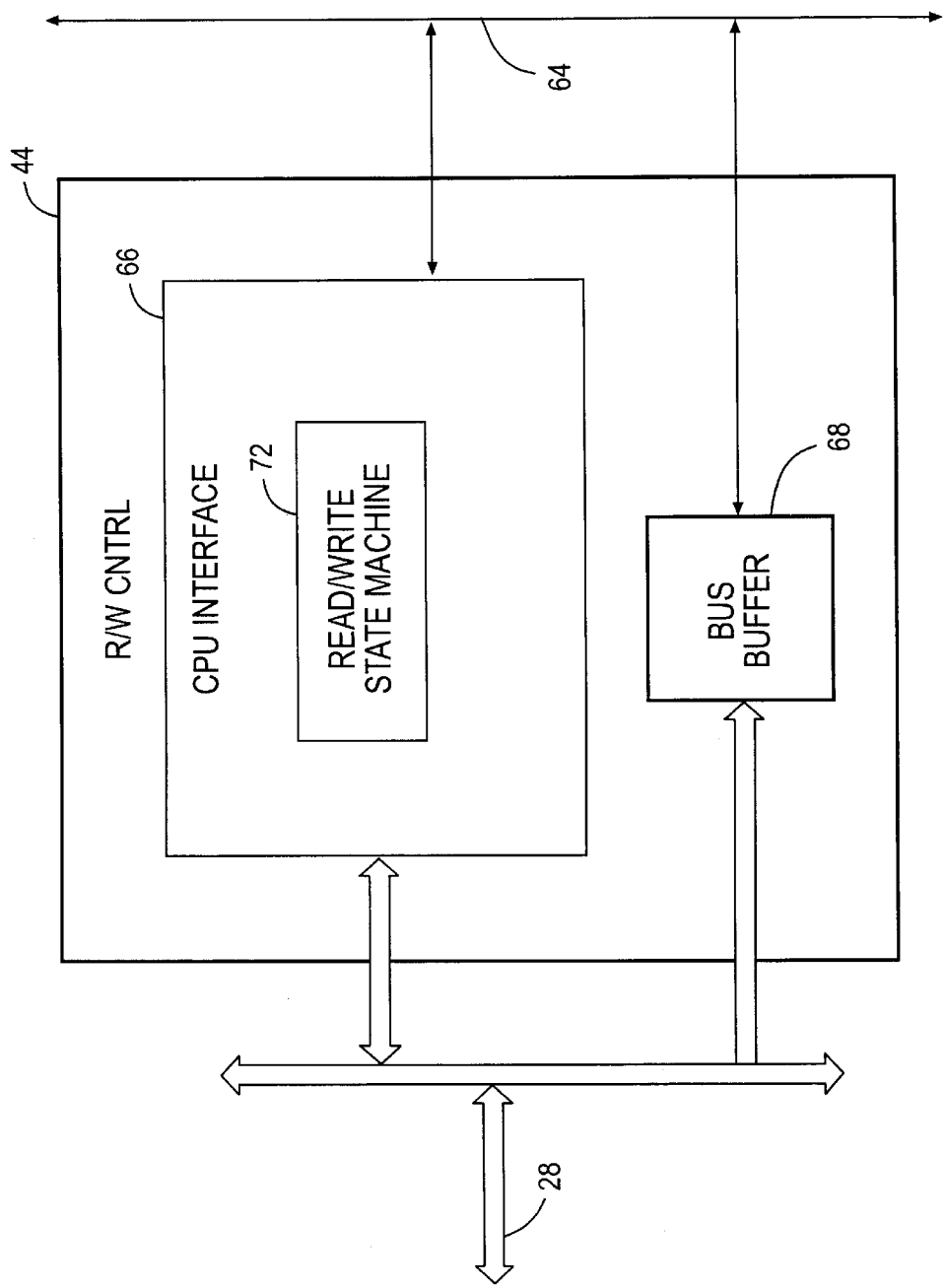
FIG. 3 is a block diagram illustrating functional blocks, including a read/write state machine, within the read/write controller of FIG. 2.

FIG. 3 is a block diagram illustrating functional blocks within the read/write controller 44 of FIG. 2. The read/write controller 44 includes a CPU interface 66 and a bus buffer 68. In addition, the CPU interface 66 includes a prior art read/write state machine 72. The CPU interface 66 monitors and places signals on the system bus 28. When the CPU issues a command, if the graphics controller 24 is ready to accept the command, the control, address, and data signals associated with the command are stored in the bus buffer 68. The graphics controller 24 processes the command using the command information stored in the bus buffer 68. If the CPU 22 issues a write command, the memory write data is copied from the bus buffer 68 and stored in the location in memory 36 that is specified by the address stored in bus buffer 68. If the CPU 22 issues a read command, the requested memory read data is copied from the location in memory 36 that is specified by the address stored in bus buffer 68, and stored in the local bus mux 46. The local bus mux 46 stores the requested memory read data in flip-flop type registers. As explained below, the requested memory read data is stored on the rising edge of the bus clock 32 signal. The CPU 22 then obtains the requested memory read data by sampling the local bus mux 46 via the system bus 28. The read/write state machine 72 is typically implemented as a logic circuit.

Figure 10:
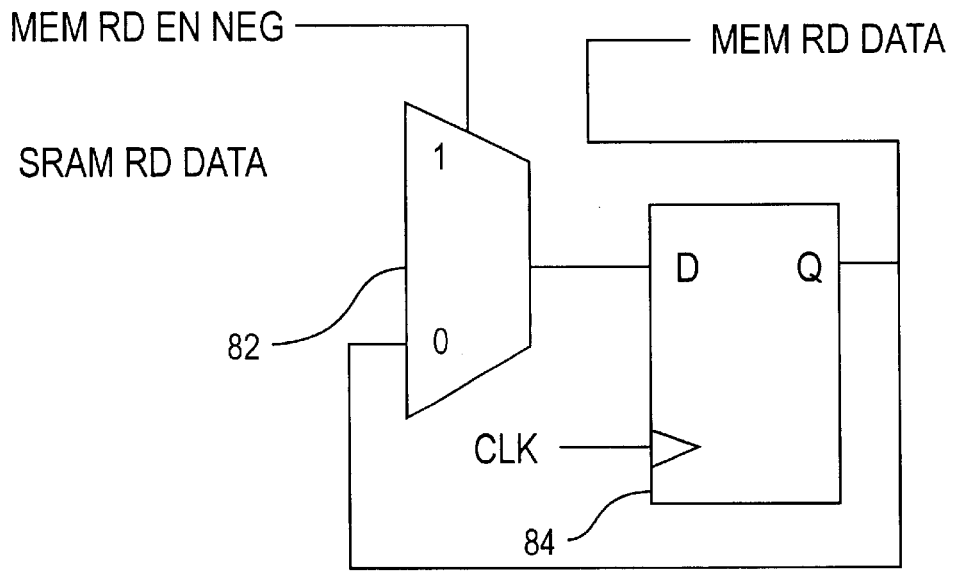
FIG. 10 is a diagram of a circuit within the local bus multiplexer of FIG. 2.

FIG. 10 is a diagram of a circuit within the local bus mux 46 of FIG. 2 that illustrates how memory read data is stored on the rising edge of the bus clock 32 signal. The shown circuit comprises a multiplexer 82 and a flip-flop type register 84. If the signal MEM RD EN NEG is asserted, the requested memory read data designated by the signal SRAM RD DATA is transferred from the number 1 input of the multiplexer 82 to the D input of the flip-flop type register 84. When the bus clock 32 signal goes high, memory read data is latched on the Q output of register 84.

Figure 4:
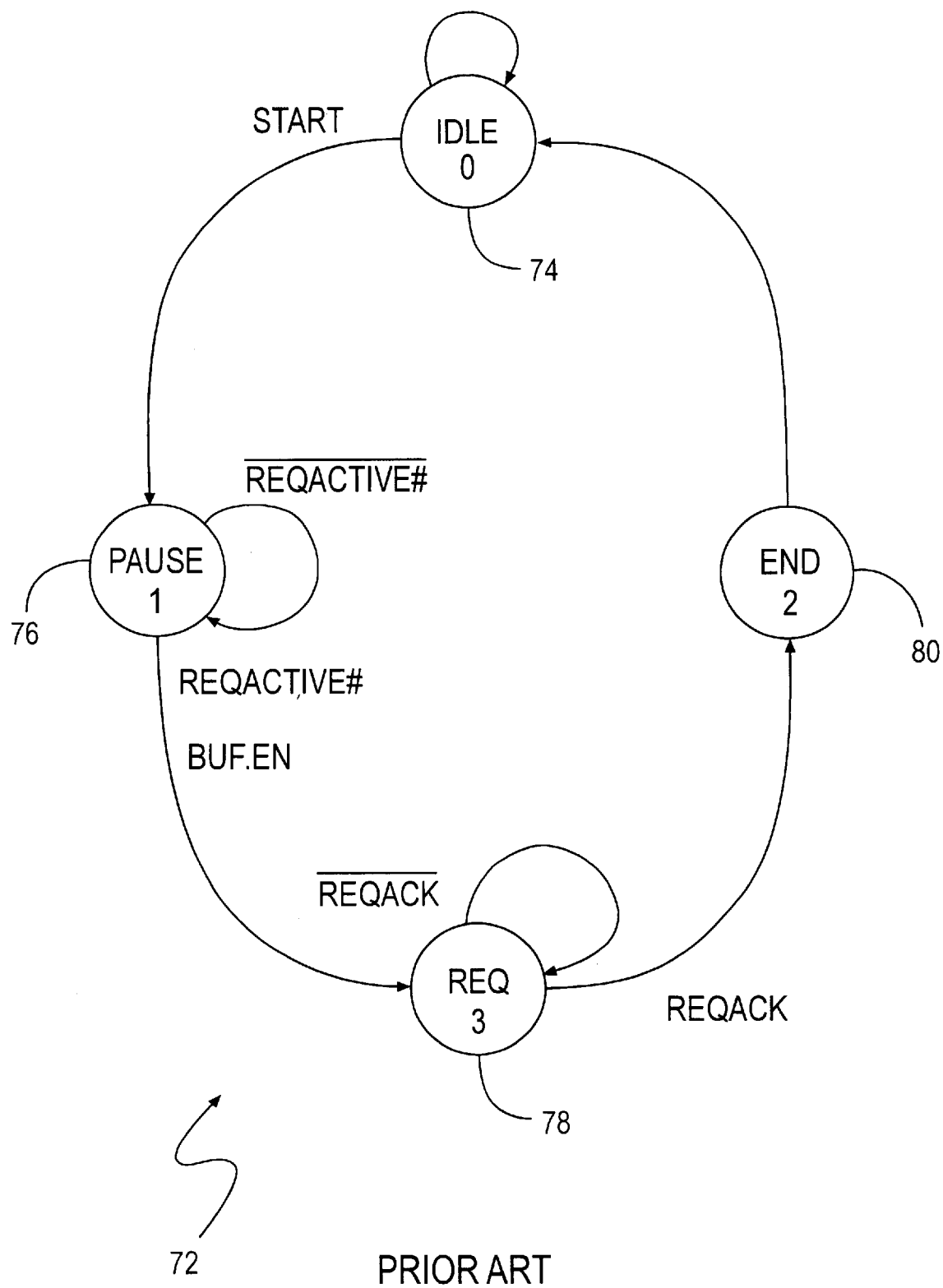
FIG. 4 is a state transition diagram for the read/write state machine of FIG. 3.

FIG. 4 provides a state transition diagram for the read/write state machine 72. In FIG. 4, each bubble represents a state. The state and allowed transitions from one state to another are described below.

State 0—IDLE

In the state IDLE 74, the read/write state machine 72 waits to receive a start signal (START). The IDLE 74 state is the initial state after start-up for the read/write state machine 72. The CPU 22 issues a command by asserting control signals. The CPU interface 66 decodes the control signals to create the START signal that indicates that a memory cycle is requested and a command has therefore issued. When the read/write state machine 72 detects the START signal, a wait signal (WAIT#) is asserted and the read/write state machine 72 transitions to a state PAUSE 76. The WAIT# signal tells the CPU 22 that the graphics controller 24 is busy. The WAIT# signal prevents the CPU 22 from issuing another command and causes the CPU 22 to begin inserting wait states.

State 1—PAUSE

In the state PAUSE 76, the read/write state machine 72 checks to see whether the graphics controller 24 is ready to process another command. If a signal REQACTIVE# is asserted low, the graphics controller 24 has not yet finished processing a previous command and the read/write state machine 72 remains in the state PAUSE 76. On the other hand, if the signal REQACTIVE# is not asserted, the graphics controller 24 has finished processing the previous command and the read/write state machine 72 transitions to a state REQUEST 78. As the state machine transitions to the state REQUEST 78, the read/write state machine 72 stores control, address, and data signals into the bus buffer 68 by asserting a buffer enable signal (BUF.EN).

State 3—REQUEST

In the state REQUEST 78, the read/write state machine 72 generates the appropriate internal signals needed to process the command and monitors a signal REQACK. In addition, the signal WAIT# is de-asserted upon entering the state REQUEST 78 if the command is for a write cycle or a register read cycle. The signal REQACK indicates that the memory cycle is complete. If the signal REQACK is asserted, the read/write state machine 72 transitions to a state END 80.

State 2—END

In the state END 80, the signal WAIT# is removed if the command is for a memory read cycle. In addition, other internal functions are performed during the state END 80. On the next BCLK, the read/write state machine 72 transitions from the state END 80 to the state IDLE 74.

Figure 5:
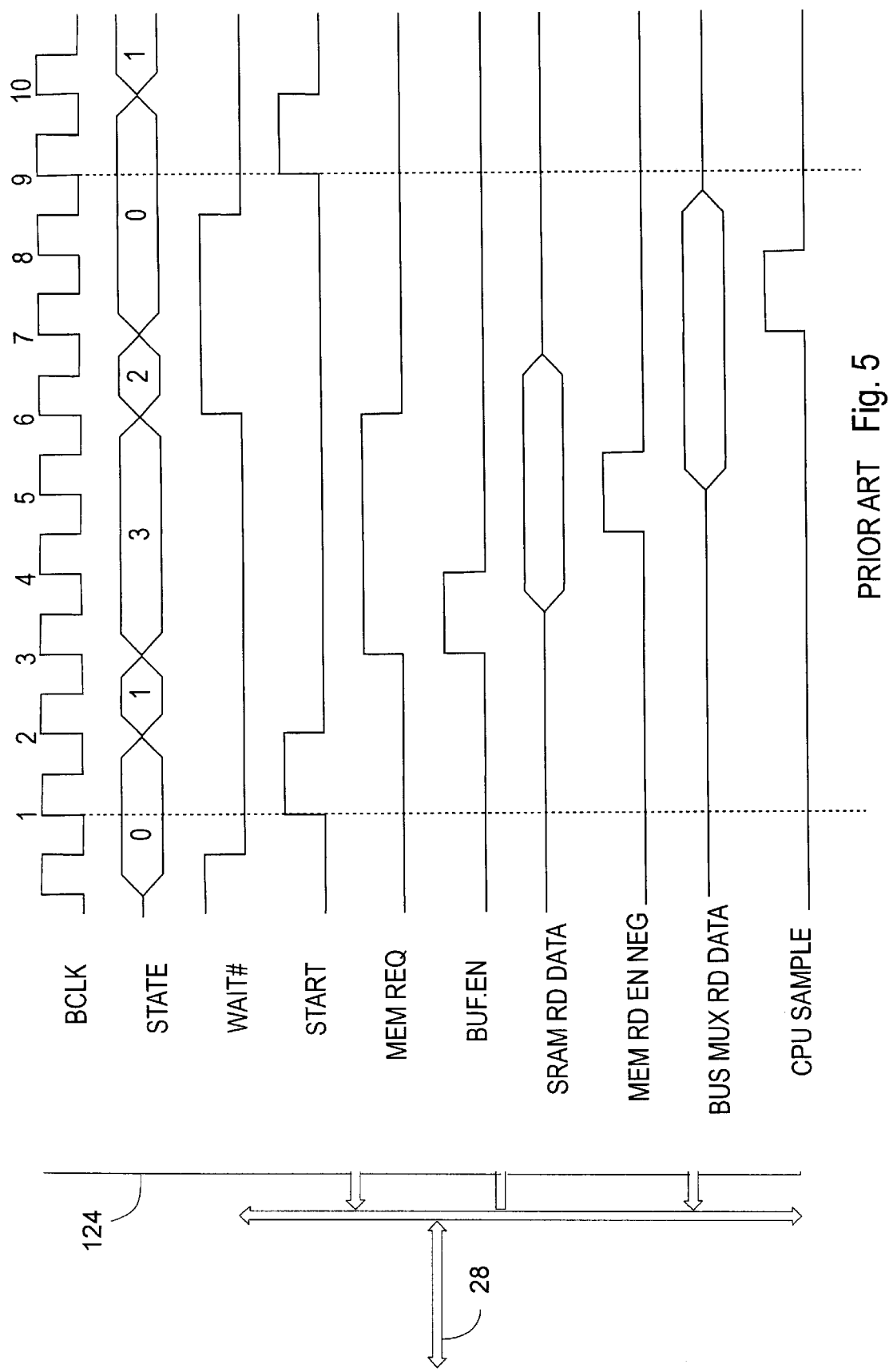
FIG. 5 is a timing diagram illustrating memory read cycles of the computer system of FIG. 1.

FIG. 5 shows a timing diagram illustrating exemplary read cycles of the system 20. The timing diagram shows the signal produced by the bus clock 32, the state of the read/write state machine 72, and various signals described below. A first memory read cycle is initiated when the CPU 22 issues a command by placing address, data, and control signals on the system bus 28. The control signals are decoded to assert the WAIT# and START signals. As shown in FIG. 3, the signal WAIT# is asserted before BCLK 1 and the signal START is asserted in BCLK 1. The signal BUF.EN is asserted on the state transition from the state PAUSE 76 to the state REQUEST 78. The signal BUF.EN signifies that the address, data, and control signals have been stored in the bus buffer 68 at the start of BCLK 3. In addition, in BCLK 3, the signal MEM REQ is asserted to direct the SRAM Controller 56 to fetch the requested information from memory 36. During BCLK 4, the requested information appears on the outputs of memory 36 as indicated by the signal designated SRAM RD DATA. In BCLK 6, the requested information is transferred from the output of memory 36 to the local bus mux 46 as indicated by the signal BUS MUX RD DATA. In addition, the signal WAIT# is de-asserted. In BCLK 7, the CPU 22 samples local bus mux 46 to obtain the requested information. The first command is completed during BCLK 8. A second memory read cycle begins in BCLK 9. As FIG. 5 shows, a disadvantage of read/write state machine 72 is that 8 BCLKS must elapse after the CPU 22 has issued a command before the graphics controller 24 can accept a subsequent command from the CPU 22. In each memory read cycle, the CPU 22 is required to insert 5 wait states.

Figure 6:
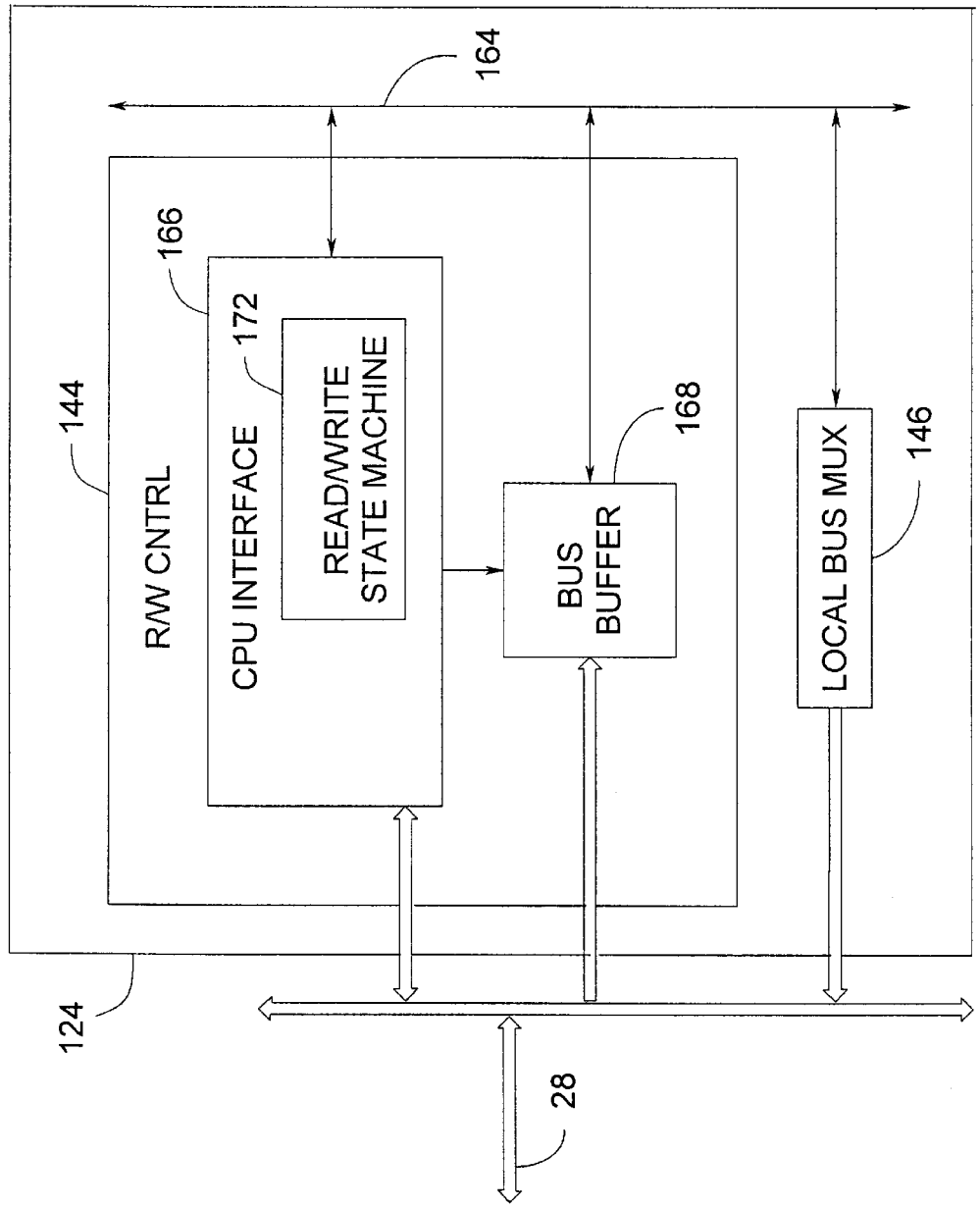
FIG. 6 is a block diagram illustrating a read/write controller, including a read/write state machine and a local bus multiplexer, within a graphics controller according to the present invention.

Having described a prior art computer system 20, a graphics controller 124 according to the present invention for use in the computer system 20 is next described. Turning to FIG. 6, the graphics controller 124 includes a read/write controller 144, a local bus multiplexer ("local bus mux") 146, and a graphics controller core bus 164. The read/write controller 144 includes a CPU interface 166 and a bus buffer 168. The CPU interface 166 includes a read/write state machine 172. The bus buffer 168 stores control, address, and data signals presented on the system bus 28 when the CPU 22 issues a command. The graphics controller 124 uses the control, address, and data signals stored in the bus buffer 168 to process the memory read command. If the CPU 22 issues a read command, the requested information is copied from the location in the memory 36 that is specified by the address stored in bus buffer 168, and stored in the local bus mux 146. The local bus mux 146 stores the requested memory read data in transparent latch type registers. As explained below, the requested memory read data is stored on the falling edge of a signal used to clock the register. The CPU 22 then obtains the requested memory read data by sampling the local bus mux 146 via the system bus 28. The read/write state machine 172 is typically implemented as a logic circuit.

Figure 11:
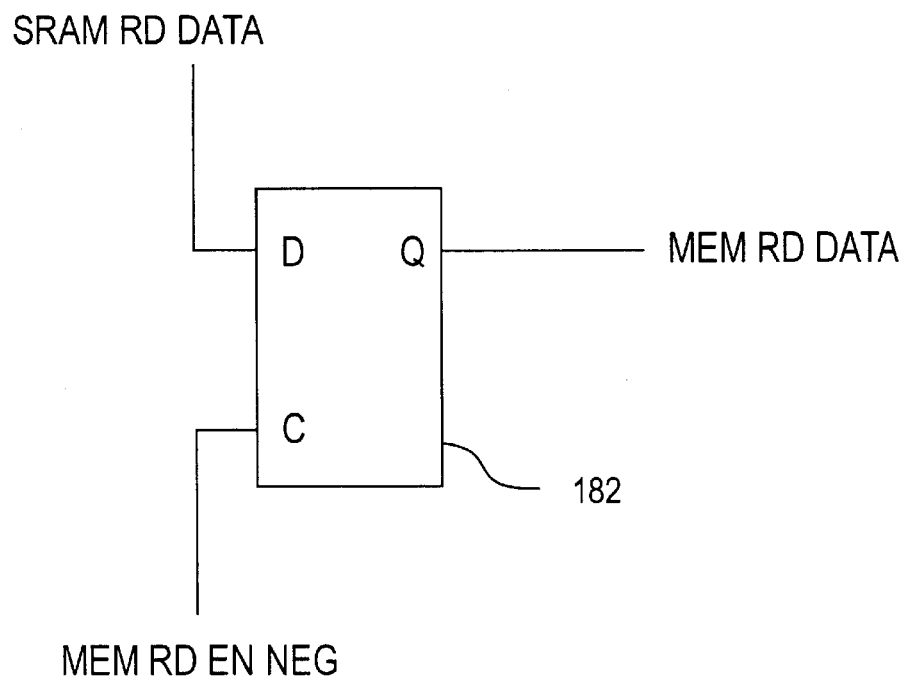
FIG. 11 is a diagram of a circuit within the local bus multiplexer of FIG. 6.

FIG. 11 is a diagram of a circuit within the local bus mux 146 of FIG. 6 that illustrates how memory read data is stored on the falling edge of the signal used to clock the register. The shown circuit comprises a transparent latch 182. In FIG. 11, the requested memory read data is designated by the signal SRAM RD DATA. When the signal MEM RD EN NEG is high, data on the D input of register 182 appears on the Q output. When the signal MEM RD EN NEG goes low, the memory read data is latched on the Q output of register 182.

Figure 7:
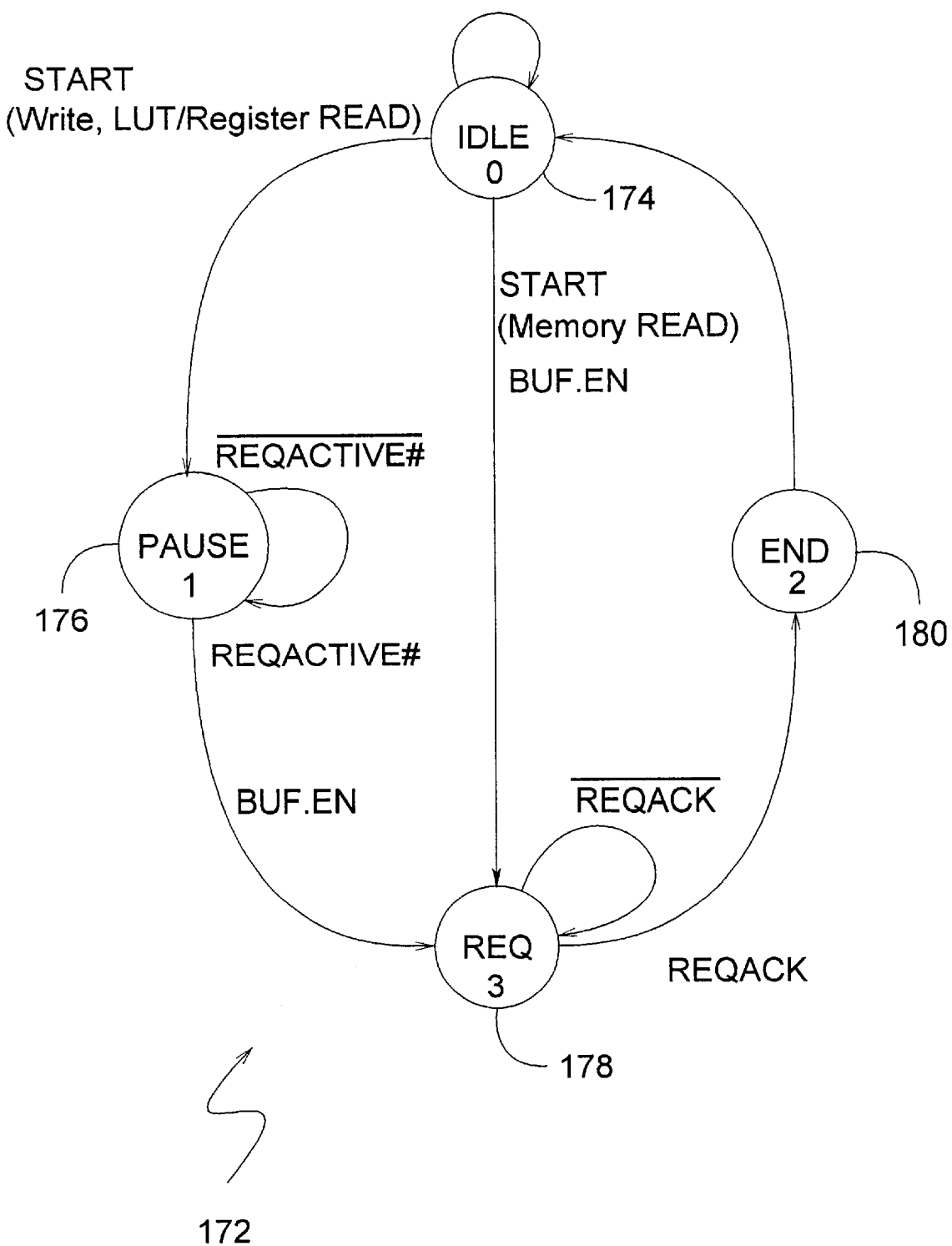
FIG. 7 is a state transition diagram for an embodiment of the read/write state machine of FIG. 6.

FIG. 7 shows an exemplary read/write state machine 172 according to the present invention. The names for the states and signals are exemplary. As shown in FIG. 7, the read/write state machine 172 has four states: IDLE 174, PAUSE 176, REQUEST 178, and END 180. Except for the differences noted below, the descriptions previously provided for the states IDLE 74, PAUSE 76, REQUEST 78, and END 80 respectively describe the states IDLE 174, PAUSE 176, REQUEST 178, and END 180.

In addition, except for the differences noted below, read/write state machine 172 has the same state transitions as those previously described for read/write state machine 72. The states of the read/write state machine 172 of the present invention differs from the prior art read/write state machine 172 as follows:

State 0—IDLE

When the read/write state machine 172 detects the signal START, the read/write state machine 172 determines whether the issued command is for a memory read cycle. If the issued command is for a memory read cycle, the BUF.EN signal is asserted to store the address, data, and control signals in the bus buffer 168. In addition, the read/write state machine transitions to a state REQUEST 178. If the issued command is not for a memory read cycle, the read/write state machine transitions to a state PAUSE 176.

State 3—REQUEST

In the state REQUEST 174, if the issued command is for a memory read cycle, the signal MEM REQ is asserted to direct the SRAM Controller 56 to fetch the requested information from memory 36. In addition, in the state REQUEST 174, the requested information appears on the outputs of memory 36 and is transferred to the local bus mux 146 where it is sampled by the CPU 22.

Figure 8:
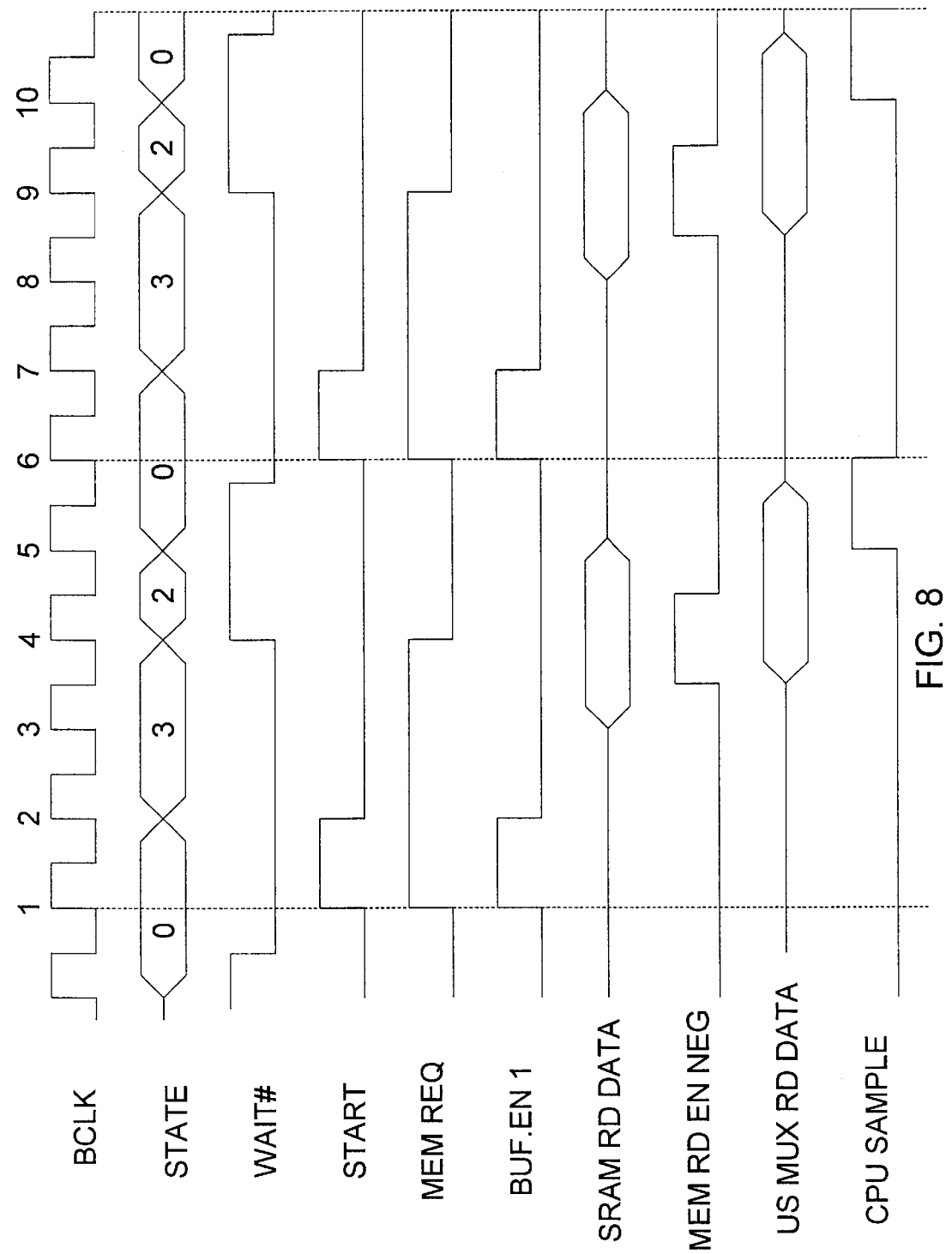
FIG. 8 is a timing diagram illustrating memory read cycles of a computer system that includes the graphics controller of FIG. 6.

FIG. 8 shows a timing diagram for exemplary read cycles in the computer system 20 that includes the graphics controller 124 according to the present invention. The timing diagram shows the signal produced by the bus clock 32, the state of the read/write state machine 172, and various signals.

A first memory read cycle is initiated when the CPU 22 issues a command by placing address, data, and control signals on the system bus 28. The control signals are decoded to assert the WAIT# and START signals. As shown in FIG. 8, the signal WAIT# is asserted before BCLK 1 and the signal START is asserted in BCLK 1. In BCLK 1, the signal BUF.EN 1 is also asserted to store the address, data, and control signals in the bus buffer 168. In BCLK 2, the signal MEM REQ is asserted to direct the SRAM Controller 56 to fetch the requested information from memory 36. During BCLK 3, the requested information appears on the outputs of memory 36 as indicated by the signal designated SRAM RD DATA. In addition, during BCLK 3, the requested information is transferred from the output of memory 36 to the local bus mux 146 on the falling edge of the signal MEM REQ EN NEG. In addition, the signal WAIT# is de-asserted. In BCLK 4, the CPU 22 samples local bus mux 146 to obtain the requested information. The first command is completed during BCLK 5 and a second memory read cycle begins in BCLK 6. As FIG. 8 shows, an advantage of read/write state machine 172 is that only 5 BCLKS must elapse after the CPU 22 has issued a read command before the graphics controller 24 can accept a subsequent command from the CPU 22. In each memory read cycle, the CPU 22 is required to insert only 2 wait states.

The present invention may be used in conjunction with the subject matter that is disclosed in U.S. patent application Ser. No. 10/131,631, ("High Performance Graphics Controller") which was filed concurrently herewith, now pending and incorporated by reference herein in its entirety. In addition, the invention may be used in conjunction with the subject matter that is disclosed in U.S. patent application Ser. No. 10/131,644 ("Graphics Controller for High Speed Transmission of Memory Write Commands"), which was filed concurrently herewith, also incorporated by reference herein in its entirety. The combination of the present invention with the subject matter of these two applications provides for further increased speed and efficiency in communications between a CPU and a graphics controller.

Figure 9:
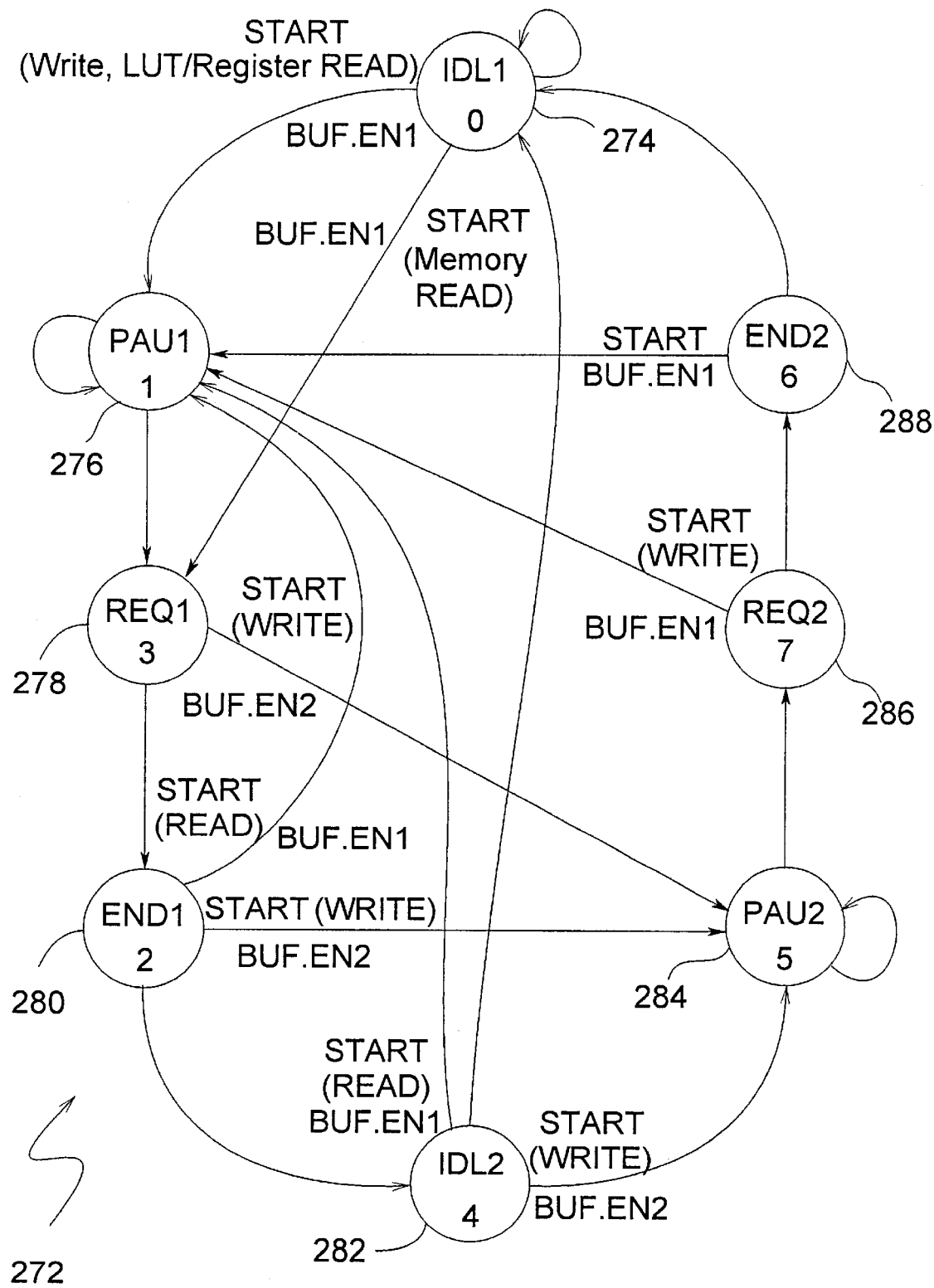
FIG. 9 is a state transition diagram for a second embodiment of the read/write state machine of FIG. 6.

FIG. 9 shows a state diagram for a graphics controller for high speed transmission of memory read commands incorporating selected features of the aforementioned High Performance Graphics Controller and the Graphics Controller for High Speed Transmission of Memory Write Commands. An exemplary read/write state machine 272 is shown. The read/write state machine 272 comprises two idle states (IDL1, IDL2), two pause states (PAU1, PAU2), two request states (REQ1, REQ2), and two end states (END1, END2), according to the Graphics Controller for High Speed Transmission of Memory Write Commands.

State 0—IDL1

In a state IDL1 274, the read/write state machine 272 waits to receive the start signal (START). The IDL1 274 state is the initial state after start-up for the read/write state machine 272. When the read/write state machine 272 detects the START signal, the wait signal (WAIT#) is asserted. The read/write state machine 272 stores control, address, and data signals into the bus buffer 168 by asserting a first buffer enable signal (BUF.EN1). In addition, the read/write state machine 272 determines whether the issued command is for a memory read cycle. If the issued command is for a memory read cycle, the read/write state machine 272 transitions to a state REQ1 278. If the issued command is not for a memory read cycle, the read/write state machine 272 transitions to a state PAU1 276.

State 1—PAU1

In the state PAU1 276, the read/write state machine 272 checks to see whether the graphics controller 124 is ready to process another command. If the graphics controller 124 has not yet finished processing a previous command, the read/write state machine 272 remains in the state PAU1 276. On the other hand, if the graphics controller 124 has finished processing the previous command, the read/write state machine 272 transitions to a state REQ1 278.

State 3—REQ1

In the state REQ1 278, the read/write state machine 272 generates the appropriate internal signals needed to process the command. In addition, the read/write state machine 272 monitors for a signal that indicates that the command is complete and for the signal START. If the read/write state machine 272 detects a signal indicating that the command is complete, the read/write state machine 272 transitions to a state END1 280. If the read/write state machine 272 additionally detects that the signal START is asserted for a command that is for a write to the memory 36, the registers 48, or the look-up table 50, the read/write state machine 272 asserts a second buffer enable signal (BUF.EN2) and transitions to a state PAU2 284. The signal BUF.EN2 causes control, address, and data signals to be stored into the bus buffer 168.

State 2—END1

In the state END1 280, internal functions are performed. In addition, the read/write state machine 272 checks to see whether a signal START has been asserted. If the signal START has been asserted and the issued command is for a write to the memory 36, the registers 48, or the look-up table 50, the read/write state machine 272 transitions to the state PAU2 284 and the signal BUF.EN2 is asserted. On the other hand, if the signal START has been asserted and the issued command is for a memory read, the read/write state machine 272 transitions to the state PAU1 276 and the signal BUF.EN1 is asserted. If the signal START has not been asserted, the read/write state machine 272 transitions a state IDL2 282.

State 4—IDL2

In the state IDL2 282, the read/write state machine 272 waits to receive the signal START. If the signal START is detected for a command that is for a write to the memory 36, the registers 48, or the look-up table 50, the read/write state machine 272 asserts the signal buffer enable signal (BUF.EN 2) as it transitions to a state PAU2 284. If the signal START is detected for a command that is for a memory read, the read/write state machine 272 transitions to the state PAU1 276 and asserts the first buffer enable signal (BUF.EN1) as it makes the transition. In both of the foregoing transitions, the signal WAIT# is asserted. On the other hand, if the signal START is not detected, the read/write state machine 272 transitions to the state IDL1 274 on the next BCLK.

State 5—PAU2

In the state PAU2 284, the read/write state machine 272 checks to see whether the graphics controller 124 is ready to process another command. If a signal is detected that indicates that the graphics controller 124 has not yet finished processing a previous command, the read/write state machine 272 remains in the state PAU2 284. On the other hand, if such a signal is not detected, the read/write state machine 272 transitions to a state REQ2 286.

State 7—REQ2

In the state REQ1 278, the read/write state machine 272 generates the appropriate internal signals needed to process the command. In addition, the read/write state machine 272 monitors for a signal that indicates that the command is complete and for the signal START. If the read/write state machine 272 detects a signal indicating the command is complete, the read/write state machine 272 transitions to a state END2 288. If the read/write state machine 272 additionally detects that the signal START is asserted for a command that is for a write to the memory 36, the registers 48, or the look-up table 50, the read/write state machine 272 asserts the first buffer enable signal (BUF.EN 1) and transitions to a state PAU1 276.

State 6—END2

In the state END2 288, internal functions are performed. In addition, the read/write state machine 272 checks to see whether a signal START has been asserted. If the signal START has been asserted and the issued command is for a write to the memory 36, the registers 48, or the look-up table 50, the read/write state machine 272 transitions to the state PAU1 276 and the signal BUF.EN1 is asserted. On the other hand, if the signal START has been asserted and the issued command is for a memory read, the read/write state machine 272 transitions to the state IDL1 274. Similarly, if the signal START has not been asserted, the read/write state machine 272 transitions to the state IDL1 274.

Persons of ordinary skill in the art will readily appreciate that the read/write state machine 172 can be implemented in a number of different ways. The read/write state machine 172 is preferably implemented as a logic circuit. A read/write logic circuit may be constructed according to traditional design methods using a plurality of simple logic gates. As one skilled in the art will appreciate, the read/write logic circuit is preferably implemented by creating a source file in a hardware definition language such as VHDL or Verilog™ because the read/write logic circuit will typically require 200–300 simple logic gates. The read/write source file may by synthesized using an automated design tool to create a net-list. The net list may be used by an automated layout tool to create a read/write logic circuit for implementation in a graphics controller chip or other ASIC. Alternatively, the net-list may be used by a device programmer to create a fuse-map that can be used to program a PLA, PLD, or other similar programmable chip to implement the read/write logic circuit.

Moreover, while the present invention is preferably implemented in hardware, it will be understood that the read/write state machine 172 may be implemented in software as well. For example, the method of read/write state machine 172 may be embodied in a program of instructions that is stored on a medium that is read and executed by a machine to regulate the transmission of command information from a CPU to a memory controller. Any medium that can be read and executed by a machine, such as RAM, ROM, floppy disk, or fixed disk is contemplated.

The computer system 20 illustrates a preferred context for the present invention. As previously indicated, other contexts for the invention are contemplated. Any host device, such as a video decoder, an audio processor, a graphics controller, or a memory controller may be substituted for the CPU 22. Moreover, the display 26 is preferably a Liquid Crystal Display; however, the present invention may be practiced without the display 26 or with any type of video display or other output device, such as a CRT display or a printer. Additionally, while the memory 36 is preferably synchronous random access memory ("SRAM"), any type of memory may be substituted for SRAM, such as DRAM. In addition, the system bus 28 may be replaced with separate busses for address, data, and control signals. Moreover, any alternative means for communicating address, data, and control information between the CPU 22 and the graphics controller 124 may be substituted for the system bus 28.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A graphics controller chip for use with an off-chip CPU issuing a plurality of commands, comprising a logic circuit coupled to a first memory, wherein said logic circuit is adapted to respond to a first issued command from the CPU by determining whether a condition that said first command is a memory read command is true and, if said condition is true, to cause the graphics controller chip to store said first command in said first memory and to begin processing said first command, and, if said condition is false, checking whether the graphics controller chip is ready to process said first command and, if the graphics controller is not ready to process said first command, to continue said checking and to send a signal to the CPU indicating that the graphics controller chip is ready to receive a second command.

2. The graphics controller chip of claim 1, wherein said logic circuit is further adapted so that, if said condition is false and if the graphics controller chip is still not ready to process said first command, said logic circuit responds to a second issued command from the CPU that is not a memory read command by sending a signal to the CPU indicating that the graphics controller chip is not ready to receive another command.

3. The graphics controller chip of claim 2, wherein the graphics controller chip is timed by a clock, and wherein said logic circuit is further adapted so that, if said condition is false, if the CPU has issued said second command, and if the graphics controller chip becomes ready to process said first command, said logic circuit delays two clock periods and sends a signal to the CPU indicating that the graphics controller chip is ready to receive another command.

4. The graphics controller chip of claim 1, further comprising a second memory coupled to said logic circuit, wherein said logic circuit is further adapted, so that if said condition is false, said logic circuit stores said first command in said first memory, and if said graphics controller chip is ready to process said first command, begins processing said first command, wherein said logic circuit is yet further adapted so that if the CPU issues said second command, if said second command is a memory write command, and if the graphics controller chip receives said second command during said processing of said first command, said logic circuit causes the graphics controller chip to store said second command in said second memory.

5. The graphics controller chip of claim 4, wherein said logic circuit is further adapted so that, if said condition is false, if the CPU issues said second command, if said second command is a memory write command, said logic circuit causes the graphics controller chip to begin processing said second command and to respond to a third issued command issued during said processing of said second command by storing said third command in said first memory.

6. The graphics controller chip of claim 1, further comprising a third memory, wherein said third memory comprises a transparent latch.

7. A method for regulating the transmission of command information from a CPU to a graphics controller, comprising the steps of:
   providing a first memory;
   identifying a first command issued by the CPU;
   determining whether a condition that said first command is a memory read command is true; and if said condition is true,
   causing the graphics controller to store said first command in said first memory and to begin processing said first command; and if said condition is false,
   checking whether the graphics controller is ready to process said first command and, if the graphics controller is not ready to process said first command, continuing said checking and sending a signal to the CPU indicating that the graphics controller is ready to receive a second command from the CPU.

8. The method of claim 7, wherein, if said condition is false, the method further comprises responding to a second command from the CPU that is not a memory read command by continuing said checking and sending a signal to the CPU indicating that the graphics controller is not ready to receive another command from the CPU if the graphics controller is still not ready to process said first command.

9. The method of claim 8, wherein, if said condition is false and the graphics controller becomes ready to process said first command, the method further comprises providing a clock, delaying two clock periods, and sending a signal to the CPU that said graphics controller is ready to receive another command if the CPU has issued a second command that is not a memory read command.

10. The method of claim 8, further comprising providing a third memory, wherein said third memory comprises a transparent latch.

11. The method of claim 7, further comprising providing a second memory, wherein, if said condition is false, storing said first command in said first memory, and if said graphics controller is ready to process said first command, processing said first command, wherein said method further comprises, if the CPU issues said second command, if said second command is issued during said step of processing said first command, and if said second command is a memory write command, storing said second command in said second memory.

12. The method of claim 11, wherein if said condition is false, if the graphics controller becomes ready to process said second command, and if said second command is a memory write command, the method further comprises processing said second command and, if the CPU issues a third command during said step of processing said second command and if said third command is a memory write command, storing said third command in said first memory.

13. A state machine for regulating the transmission of command information from a CPU to a graphics controller comprising a logic circuit and a clock for clocking the logic circuit, the logic circuit operating, at any one time, in one of a plurality of states including:

an idle state representing a state in which the graphics controller waits to receive command information from the CPU wherein, in response to the CPU having issued a first command, the logic circuit determines whether a condition that said first command is a memory read command is true and, if said condition is true, the logic circuit causes the graphics controller to store said first command in a first memory;

a first pause state representing a first state transition from said idle state that occurs in response to the CPU having issued said first command, wherein the logic circuit has determined that said condition is false, wherein, in said first pause state, the logic circuit checks whether the graphics controller is ready to process said first command; and a first request state representing a first state transition from said first pause state, wherein said first request state further represents a second state transition from said idle state that occurs in response to the CPU having issued said first command wherein said condition is true, wherein, in said first request state, the graphics controller begins processing said first command.

14. The state machine of claim 13, further comprising an end state representing a state transition from said first request state that is delayed therefrom a predetermined amount, wherein said first pause state represents a first state transition from said end state that occurs in response to an indication from the CPU that the CPU is ready to issue a second command that is not a memory read command.

15. The state machine of claim 14, wherein, in said first pause state, the logic circuit sends a signal to the CPU indicating that the graphics controller is ready to receive said second command.

16. The state machine of claim 15, wherein, in said first pause state, if the graphics controller is not yet ready to process said first command and the CPU issues said second command, the graphics controller sends a signal to the CPU indicating that the graphics controller is not ready to receive another command.

17. The state machine of claim 13, further comprising a second request state and a second pause state, wherein said second pause state represents a state transition from said first request state that occurs in response to the CPU having issued said second command and said second command is a memory write command, wherein said second request state represents a state transition from said second pause state that occurs in response to the graphics controller being ready to process said second command, wherein, in said second request state, the logic circuit causes the graphics controller to begin processing said second command.

18. The state machine of claim 17, wherein said first pause state represents a first state transition from said second request state that occurs in response to the CPU having issued a third command that is a memory write command.

19. A system for displaying information, the system being embodied in at least first and second chips and a graphics display device, wherein said first chip comprises a CPU for issuing a plurality of commands having associated data for display by said graphics display device, and wherein said second chip comprises:

a first command memory;

a data memory; and a logic circuit for communicating with said CPU and said graphics display device, and coupled to said first command memory and said data memory, wherein said CPU is adapted to control the output of said graphics display device through said logic circuit, said logic circuit being adapted to respond to a first issued command from the CPU by determining whether a condition that said first command is a memory read command is true and, if said condition is true, to cause said second chip to store said first command in said first command memory and to begin processing said first command, and, if said condition is false, to check whether said second chip is ready to process said first command and, if said second chip is not ready to process said first command, to continue said checking, and in parallel, to send a signal to the said CPU indicating that said logic circuit is ready to receive a second command.

20. The system of claim 19, wherein said logic circuit is adapted, if said condition is false, if said CPU issues said second command and said second command is not a memory read command, and if said second chip has not yet become ready to process said first command, to send a signal to the CPU indicating that said second chip is not ready to receive another command.

21. The system of claim 20, wherein said system further comprises a clock and said logic circuit is adapted so that, if said condition is false, if said CPU issues said second command and said second command is not a memory read command, and if said second chip thereafter becomes ready to process said first command, said logic circuit delays two clock periods and sends a signal to the CPU indicating that said second chip is ready to receive another command.

22. The system of claim 19, wherein said second chip further comprises a second command memory, and wherein said logic circuit is further adapted so that, if said condition is false, if said second chip is ready to process said first command, and if said first command is a memory write command, said logic circuit causes the second chip to store said first command in said first command memory and to begin processing said first command, wherein said logic circuit is further adapted so that if the CPU issues said second command and said second command is a memory write command, and said second chip receives said second command during said processing, said logic circuit stores said second command in said second command memory.

23. The system of claim 22, wherein said logic circuit is further adapted so that, if said condition is false, if said second chip becomes ready to process said second command, and if said second command is a memory write command, said logic circuit causes the second chip to begin processing said second command, wherein if the CPU issues a third command that is a memory write command and said second chip receives said third command during said processing of said second command, said logic circuit stores said third command in said first command memory.

24. The system of claim 19, wherein said second chip further comprises a bus memory, wherein said bus memory comprises a transparent latch.

25. A machine readable medium embodying a program of instructions executable by the machine to perform a method for regulating the transmission of command information from a CPU to a graphics controller, the method of regulating comprising the steps of:

providing a first memory;

identifying a first command issued by the CPU;

determining whether a condition that said first command is a memory read command is true; and if said condition is true, causing the graphics controller to store said first command in said first memory and to begin processing said first command; and if said condition is false, checking whether the graphics controller is ready to process said first command and, if the graphics controller is not ready to process said first command, continuing said checking and sending a signal to the CPU indicating that the graphics controller is ready to receive a second command from the CPU.

26. The medium of claim 25, wherein, if said condition is false, the method further comprises responding to a second command from the CPU that is not a memory read command by continuing said checking and sending a signal to the CPU indicating that the graphics controller is not ready to receive another command from the CPU if the graphics controller is still not ready to process said first command.

27. The medium of claim 26, wherein, if said condition is false and the graphics controller becomes ready to process said first command, the method further comprises providing a clock, delaying two clock periods, and sending a signal to the CPU that said graphics controller is ready to receive another command if the CPU has issued a second command that is not a memory read command.

28. The medium of claim 25, further comprising providing a second memory, wherein, if said condition is false, storing said first command in said first memory, and if said graphics controller is ready to process said first command, processing said first command, wherein the method further comprises, it the CPU issues said second command, if said second command is issued during said step of processing said first command, and if said first command is a memory write command, storing second command in said second memory.

29. The medium of claim 28, wherein if said condition is false, if the graphics controller becomes ready to process said second command, and if said second command is a memory write command, the method further comprises processing said second command and, if the CPU issues a third command during said step of processing said second command and if said third command is a memory write command, storing said third command in said first memory.

30. The medium of claim 25, further comprising providing a third memory, wherein said third memory comprises a transparent latch.

* * * * *